US007852342B2

(12) United States Patent
Leichtling et al.

(10) Patent No.: US 7,852,342 B2
(45) Date of Patent: Dec. 14, 2010

(54) REMOTE CLIENT GRAPHICS RENDERING (75) Inventors: Ivan Leichtling, Kirkland, WA (US);
Chenyin Zhong, Bellevue, WA (US);
Joy Chik, Sammamish, WA (US); Gilles Khouzam, Bothell, WA (US); Paul David, Kirkland, WA (US); Oreste Dorin Ungureanu, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 931 days.

(21) Appl. No.: 10/965,701

(22) Filed: Oct. 14, 2004

(65) Prior Publication Data

US 2006/0082583 A1 Apr. 20, 2006

(51) Int. Cl.
*G06T 15/00* (2006.01)
*G06T 1/00* (2006.01)
(52) U.S. Cl. ...................................... 345/522
(58) Field of Classification Search ................. 345/650, 345/522
See application file for complete search history.

(56) References Cited

U.S. PATENT DOCUMENTS

| 5,652,749 | A |  | 7/1997 | Davenport et al. |
| 5,657,390 | A |  | 8/1997 | Elgamal et al. |
| 5,842,040 | A |  | 11/1998 | Hughes et al. |
| 5,862,383 | A |  | 1/1999 | Laitinen |
| 6,038,232 | A |  | 3/2000 | Jung et al. |
| 6,081,265 | A |  | 6/2000 | Nakayama et al. |
| 6,411,301 | B1 |  | 6/2002 | Parikh et al. |
| 6,421,058 | B2 |  | 7/2002 | Parikh et al. |
| 6,421,738 | B1 |  | 7/2002 | Ratan et al. |
| 6,424,348 | B2 |  | 7/2002 | Parikh et al. |
| 6,434,578 | B1 | * | 8/2002 | McCauley et al. .......... 715/210 |
| 6,452,600 | B1 |  | 9/2002 | Parikh et al. |
| 6,466,218 | B2 |  | 10/2002 | Parikh et al. |
| 6,538,656 | B1 |  | 3/2003 | Cheung et al. |
| 6,615,382 | B1 |  | 9/2003 | Kang et al. |
| 6,697,074 | B2 |  | 2/2004 | Parikh et al. |
| 6,798,418 | B1 |  | 9/2004 | Sartori et al. |
| 6,867,781 | B1 |  | 3/2005 | Van Hook et al. |
| 6,957,769 | B2 |  | 10/2005 | Hepworth et al. |
| 7,002,591 | B1 |  | 2/2006 | Leather et al. |

(Continued)

FOREIGN PATENT DOCUMENTS

EP 1320240 (A2) 6/2003

(Continued)

OTHER PUBLICATIONS

X Protocol Reference Manual, for X11, Release 6, 1995, pp. 5-40.*

(Continued)

*Primary Examiner*—Jeffery A Brier
(74) *Attorney, Agent, or Firm*—Lee & Hayes, PLLC (57) ABSTRACT A server computer hosts one or more application programs that are accessed by a client computer. Higher-level graphics commands describing graphics images are received from the application programs. The server computer determines whether the client computer is able to generate graphics using the higher-level graphics commands or generates graphics using relatively lower-level graphics commands. The server computer sends higher-level or relatively lower-level graphics commands depending on whether the client computer generates graphics using higher-level or relatively lower-level graphics commands.

16 Claims, 6 Drawing Sheets

U.S. PATENT DOCUMENTS

| | | | |
|---|---|---|---|
| 7,075,538 B2 | 7/2006 | Peacock | |
| 7,191,233 B2 | 3/2007 | Miller | |
| 7,196,710 B1 | 3/2007 | Fouladi et al. | |
| 7,200,809 B1 | 4/2007 | Paul et al. | |
| 7,216,288 B2 | 5/2007 | Westerink et al. | |
| 7,274,368 B1 * | 9/2007 | Keslin | 345/522 |
| 7,434,166 B2 | 10/2008 | Acharya et al. | |
| 2002/0058499 A1 | 5/2002 | Ortiz | |
| 2002/0103935 A1 | 8/2002 | Fishman et al. | |
| 2003/0017846 A1 | 1/2003 | Estevez et al. | |
| 2003/0033560 A1 | 2/2003 | Dassow et al. | |
| 2003/0076328 A1 | 4/2003 | Beda et al. | |
| 2003/0076329 A1 | 4/2003 | Beda et al. | |
| 2003/0222883 A1 | 12/2003 | Deniau et al. | |
| 2004/0081202 A1 | 4/2004 | Minami et al. | |
| 2004/0123109 A1 | 6/2004 | Choi | |
| 2004/0177373 A1 | 9/2004 | Kawabe et al. | |
| 2004/0199574 A1 | 10/2004 | Franco et al. | |
| 2005/0123267 A1 | 6/2005 | Tsumagari et al. | |
| 2005/0132385 A1 | 6/2005 | Bourges-Sevenier | |
| 2005/0163493 A1 | 7/2005 | Kobayashi et al. | |
| 2005/0182791 A1 | 8/2005 | Lim et al. | |
| 2006/0080382 A1 | 4/2006 | Dutta et al. | |

FOREIGN PATENT DOCUMENTS

| | | |
|---|---|---|
| JP | 2005151147 (A) | 6/2005 |
| WO | WO0122238 (A1) | 3/2001 |
| WO | WO2005029369 (A2) | 3/2005 |

OTHER PUBLICATIONS

European Patent Office Search Report dated Dec. 5, 2008, 8 pages.

PCT International Search Report dated Jan. 2, 2007, 3 pages.

* cited by examiner

REMOTE CLIENT GRAPHICS RENDERING

TECHNICAL FIELD

This invention relates to the transmission of graphics to remote client computers.

BACKGROUND

A server computer may host application programs remotely accessed by client computers. Terminal service platforms, such as Windows® Server 2003 operating system provided by the Microsoft Corporation, is one implementation of such technology, where application programs run on a central server while a user interface is presented on a remote computer. The user interface in implementations such as this can include complex graphics.

The central server computer is referred to as a host computer or terminal server. The remote computer is referred to as a remote terminal or remote client, and communicates with the server through a communications medium such as a network. Bandwidth over such a communications medium is often limited.

Applications programs are typically designed to operate in conjunction with a local display device or monitor. In many operating systems, such as the Windows® Server 2003 operating system, application programs send relatively high-level graphics commands or primitives to operating system components. Such commands might specify or define colors, lines, shapes, and other graphics constructs. The operating system components interpret or convert such high-level commands into lower-level graphics information such as individual pixel values or bitmaps. Such a process of converting from a relatively high-level graphics specification to a relatively lower-level graphics specification will be referred to herein as rendering.

When operating on a terminal server, an application program can utilize the same operating system components to render low-level graphics data from higher-level commands or primitives. In this situation, however, the operating system components are configured to provide the rendered lower-level graphics commands to a remote client, which utilizes this information to control its display device.

When serving several remote computers, graphics data such as that described above can easily create network congestion. Because of this, attempts are made to optimize and/or compress the lower-level graphics data sent to the client. In some cases, however, such optimization and compression degrades the quality or resolution of the display data. Typically this is not a problem with simple media graphics; however, with rich media graphics having significantly more content, optimized and/or compressed graphics data may not adequately represent what was intended by the application program.

An option is to increase network bandwidth to allow uncompromised lower-level graphics data to be sent to clients. However, increasing network bandwidth adds expense and is not always feasible.

Furthermore, due to their relatively large content as compared to simple graphics, rich media graphics require greater server processing resources than simple graphics. As the server CPU requirements (i.e., CPU cycles) for each client session increases, the overall server scalability is reduced, where scalability is defined as the number of high fidelity concurrent connections to client computers the server can support. Thus the server is able to support fewer client computers.

SUMMARY

One or more client computers remotely access one or more application programs resident and executing on a server computer. The server computer determines the capability of client computers to use relatively higher-level graphics commands. Client computers generate graphics using either the relatively higher-level graphics commands or graphics primitives or relatively lower-level legacy graphics commands. The server computer provides either higher-level graphics commands or lower-level graphics commands to client computers, depending on the capacity of the client computers to generate graphics.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Client-Server Computer System

Figure 1:
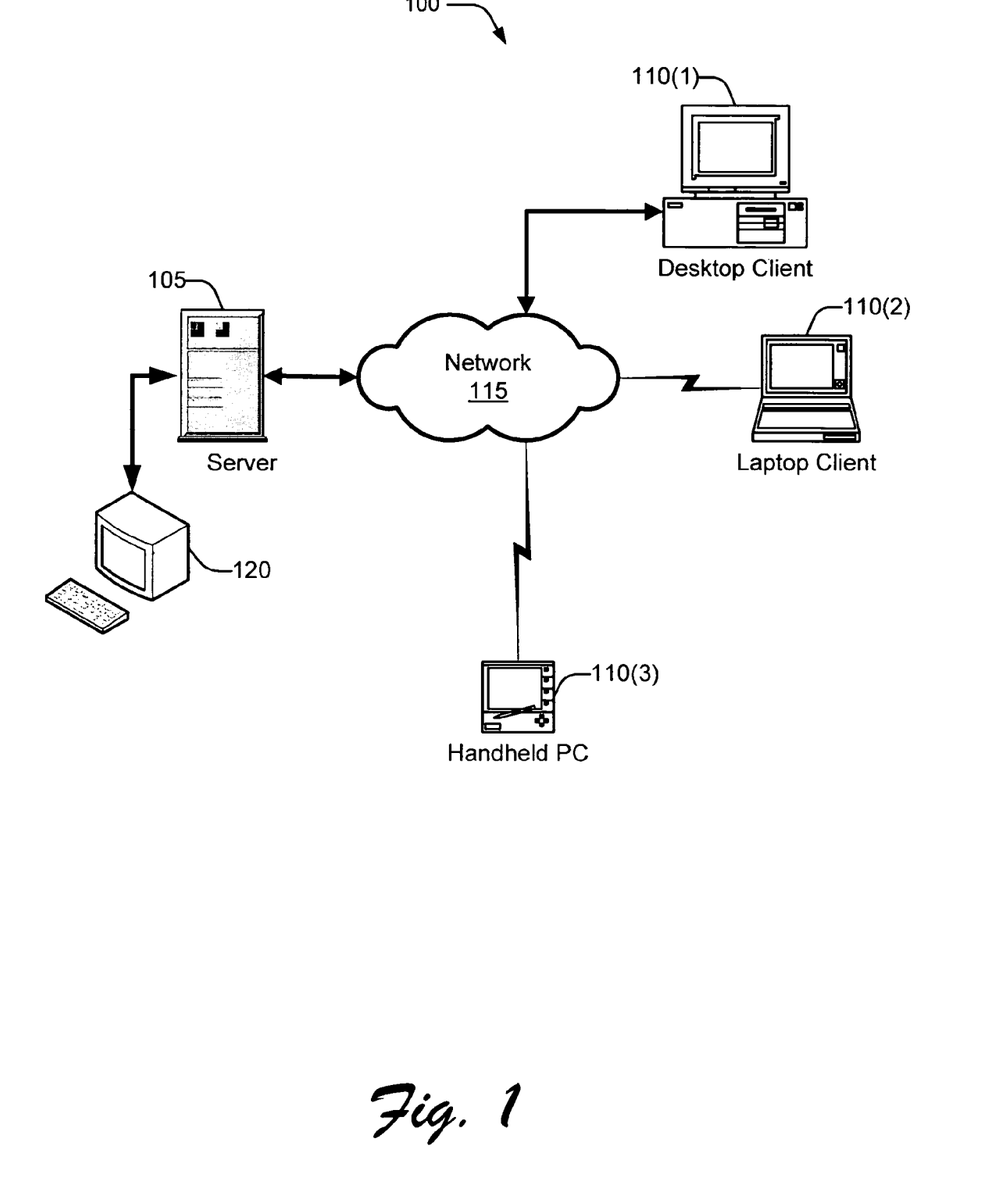
FIG. 1 is an illustration of a server computer-client computer system.

FIG. 1 shows a server computer-client computer system 100. The computer system 100 includes a server computer 105 connected to multiple client computers 110(1)-110(3) connected via a network 115. One or more application programs run on server computer 105 on behalf of the client computers 110. The application programs generate graphics commands that are ultimately used to generate graphics on a display device of a remote client computer 110.

The computer system 100 is representative of many different architecture including direct dialup via modem, enterprise LANs (local area networks), WANs (wide area networks) and the Internet. The network 115 may be implemented in a number of ways to support such networking contexts, including both wired-based technologies and wireless technologies. Aspects of this invention are not limited to one specific network architecture or network technology.

The server computer 105 may be implemented as a Windows® Server 2003, Windows® NT server, or any other server platform. A more detailed description of the server computer 105 is given below with respect to FIG. 6. Server computer 105 supports or hosts one more application programs accessed by client computers 110 through a communication protocol such as remote desktop protocol (RDP) as defined by the Microsoft Corporation. Through the communication protocol, server computer 105 determines if a client computer of client computers 110 is able to generate graphics using relatively higher-level graphics commands, commands that are received from the applications programs and used to generate graphics locally at the server computer 105. Alternatively, if a client computer 110 is not able to generate graphics using the relatively higher-level graphics commands, relatively lower-level graphics commands which are rendered at the server computer 105 are sent to the client computer 110.

The client computers 110 represent various kinds of computers or computing devices that may connect to server 105 over the network 115. A more detailed example of the client computers 110 is given below with respect to FIG. 6. Client computer 110(1) is a conventional desktop personal computer (PC), which includes a local operation system, processing unit, and storage system. As one example, the client computer 110(1) is a general-purpose PC implemented with a Windows® brand operating system from the Microsoft Corporation.

Client computer 110(2) is illustrated as a portable laptop computer, which may be connected to the network via a conventional network card or a modem connection. The client computer 110(2) is standalone computer that can be configured with its own operating system, processing unit, and storage system. The client computer 110(2) may likewise be configured to run a Windows® brand operating system.

Client computer 110(3) is a handheld PC, which possesses less functionality than a general-purpose computer. The client 110(3) is preferably equipped with a Windows® brand operating system, such as Windows® CE operating system from the Microsoft Corporation.

A display device 120 which includes a display and input devices such as a keyboard and mouse connects locally to server 105. Display device 120 particularly provides user input to application programs resident on server computer 105. Graphics are generated at display device 120 by a graphics composition engine resident in server computer 105, where the graphics composition engine receives higher-level graphics commands from the resident application programs.

Architectures

The application programs resident on server computer 105 specify graphics in terms of relatively higher-level graphics commands or graphics primitives. For example, in the Windows® Server 2003 operating system environment, application programs can utilize graphical display interface (GDI) graphics components of the operating system. Using GDI graphics components application programs can provide the relatively higher-level graphics commands which can specify graphics in terms that specify shapes, colors, fonts, and other attributes. The GDI graphics components may also render the relatively higher-level commands to relatively lower-level commands.

Figure 2:
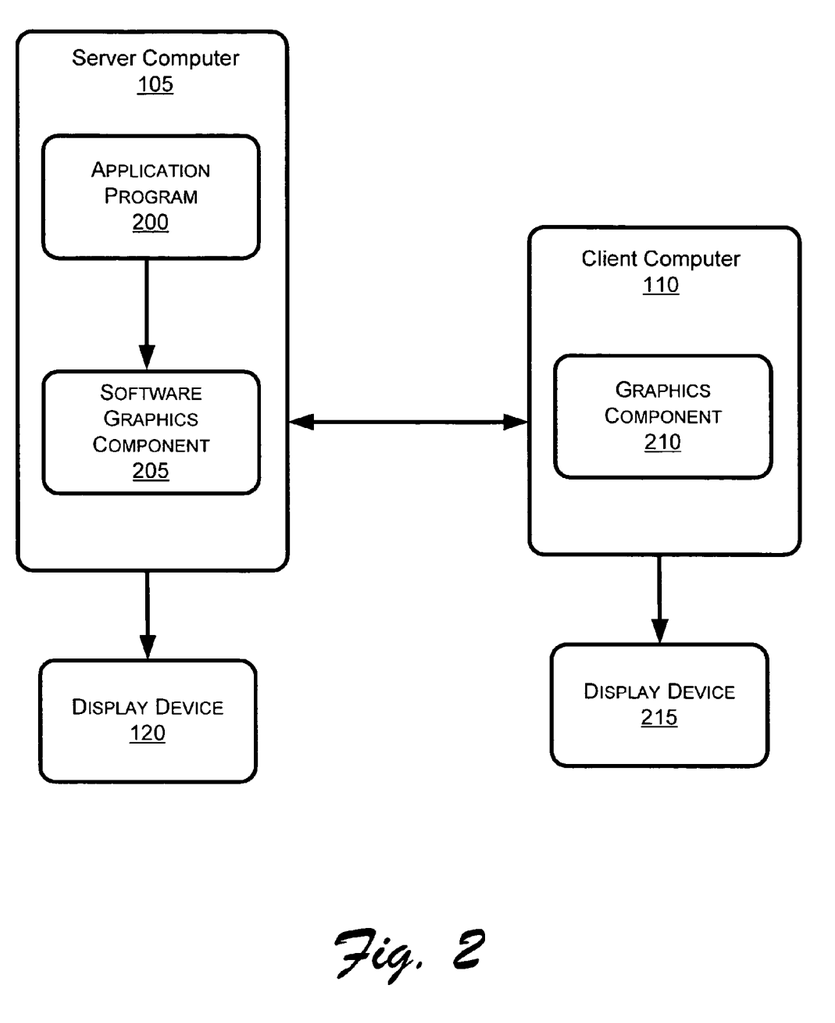
FIG. 2 is a block diagram of server computer and client computer graphics components.

FIG. 2 shows example architectures at a server computer and a client computer. Server computer 105 includes an application program 200, and a software graphics component 205. Software graphics component 205 may include multiple components, as further described below. In general, software graphics component 205 is able to receive higher-level graphics commands from application program 200. The higher-level graphics commands are used to generate graphics locally and displayed on display device 120. Displaying graphics on display device 120 is particularly performed when "shadowing" is conducted where the same graphics generated and displayed at client computer 110 are generated and displayed at server computer 105.

The server computer 105 communicates with the client computer 110 and determines whether the client computer 105 is able to generate graphics using higher-level graphics commands or lower-level graphics commands. In cases when the client computer 105 is able to generate graphics using the higher-level graphics commands, the server computer 105 sends the higher level graphics commands to the client computer 110. In cases where the client computer 110 is not able to generate graphics using the higher-level graphics commands, the server computer 105 renders lower-level graphics commands such as bitmaps from the higher-level graphics commands, and sends the lower-level graphics commands to the client computer. A graphics component 210 receives either higher-level graphics commands or lower-level graphics commands, and generates graphics displayed on a display device 215 at the client computer 110.

Figure 3:
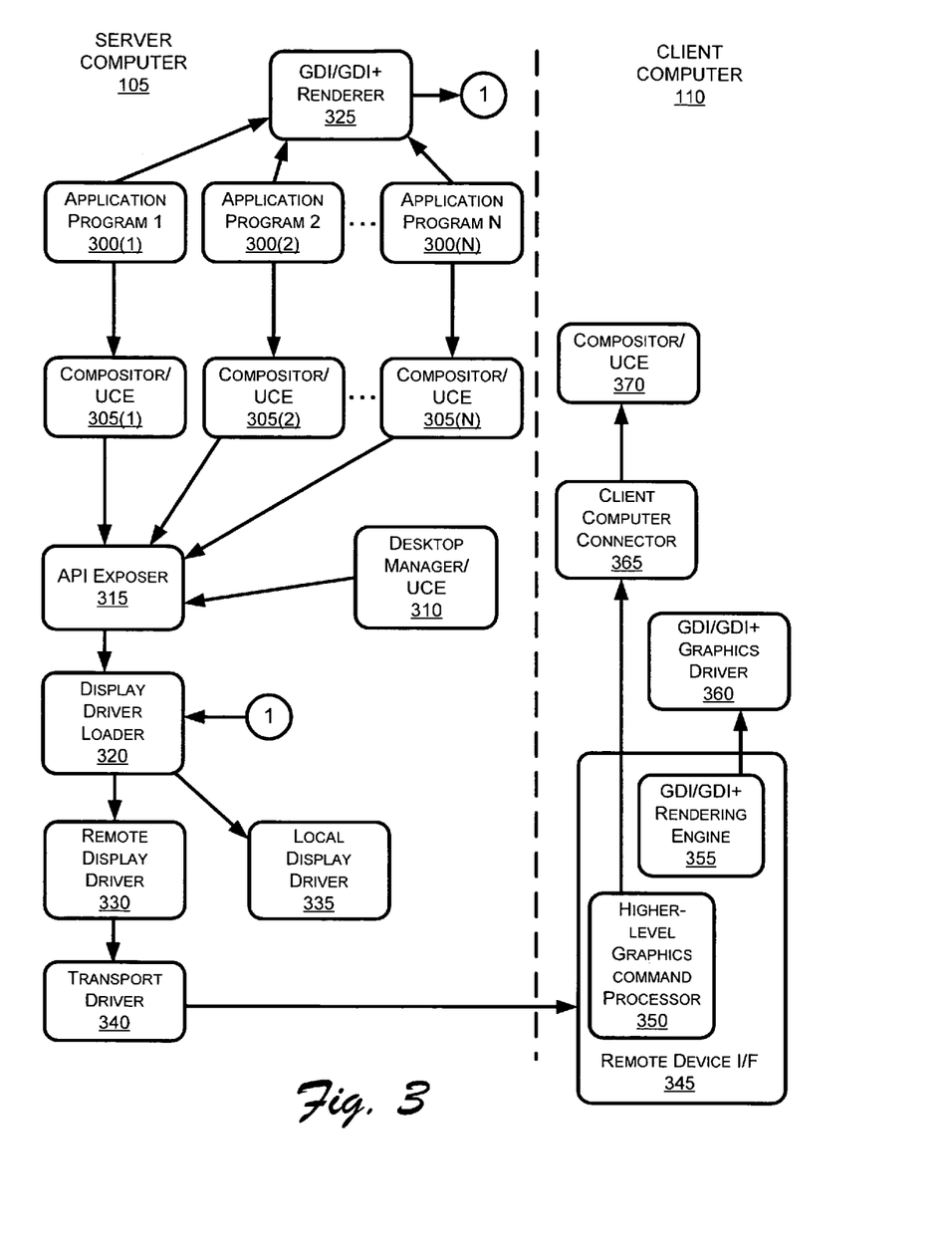
FIG. 3 is block diagram of server computer and client computer architectures used to process higher-level graphics commands and lower-level graphics commands used to generate graphics at the server computer and at the client computer.

FIG. 3 shows an example of more detailed architecture implementations at a server computer and a client computer. The architectures are particularly designed to provide higher-level graphics commands in the form of formatted graphics instructions to client computers such as client computers 110 that are capable of generating graphics using such higher-level graphics commands. Furthermore, for particular client computers 110 that use lower-level graphics commands or legacy graphics data to generate graphics, lower-level graphics commands are rendered from higher-level graphics commands data at the server computer 105; received and used by the particular client computers 110 to generate graphics. In addition higher-level graphics commands are processed at the server computer 105 to generate and locally display graphics.

One or more application programs 300(1)-300(N), such as application program 200 of FIG. 2, may be hosted at the server computer 105, and accessed by client computer 110. Application programs 300 provide relatively higher-level graphics commands or are rendered to relatively lower-level graphics commands. Examples of higher-level graphics commands include instructions as to drawing a shape or line, providing a color gradient, and a vector (i.e. direction).

Application programs 300 may include a dedicated thread for graphics compositing or generating, where the dedicated thread is used to monitor a communication protocol (e.g., RDP) used in connecting compositor/UCE (unified composition engine) 305(1)-305(N). A dedicated compositor/UCE 305 is provided for each of application programs 300.

Compositor/UCE modules 305 are visual composition modules that support a media integration layer (MIL) that provides graphic information used by one or more client computer platforms (e.g., Windows® brand operating systems). In specific, compositor/UCE 305 processes or extracts higher-level graphics commands from an application program 300. As described further below, the higher-level graphics commands are subsequently processed and sent to a client computer 110, if client computer 110 is able to use higher-level graphics commands to generate graphics.

When one or more application programs 300 are running in a desktop or Windows® environment, a display or graphical image is shown that includes graphics from one more application programs 300 and a desktop or Window® environment. A desktop manager/UCE 310 provides higher-level graphics commands as to graphics provided by the desktop or Window® environment in which graphics from application programs 300 are combined.

Compositor/UCE 305 and desktop manager/UCE 310 provide higher-level graphics commands to an application program interface (API) exposer 315. API exposer 315 is an interface that allows compositor/UCE 305 and desktop manager/UCE 310 to communicate with a display driver loader 320.

For legacy client computers which render graphics using lower-level graphics commands processed from higher-level graphics commands at the server, higher-level graphics commands from application programs 300 are provided to a GDI/GDI+ renderer 325. GDI/GDI+ renderer 325 renders the graphics primitives into lower-level graphics commands sent to display driver loader 320.

Display driver loader 320 loads a remote display driver 330 and a local display driver 335. Higher-level or lower-level graphics commands are sent to the remote display driver 330 which formats the graphics commands into an appropriate format as defined by the communication protocol used by the server and the client. In particular, remote display driver 330 may package, perform any caching on, and/or compress the graphics commands.

The local display driver 335 receives higher-level graphics commands generated into graphics locally at the server computer 105. The local display driver 335 is used when displaying the graphics locally and/or when shadowing. Shadowing or remote assistance is performed when graphic images (i.e., higher-level or lower-level graphics commands) that are sent to the client computer are viewed at a local display device such as display device 120 of FIG. 1.

Formatted higher-level or lower-level graphics commands from remote display driver 330 are sent to a transport driver 335 for transmission over a network or networks such as network 115 of FIG. 1, to the client computer 110. Transport driver 335 may be based on one of several transport protocols such as transmission control protocol/Internet protocol (TCP/IP). Transport driver 335 may package the formatted graphics primitives or graphics data into data packets.

Graphics commands (i.e., data packets) are received at the client computer 110 through a remote device interface 345. Remote device interface 345 may be based on the communication protocol between the server computer 105 and client computer 110, and may negotiate or inform the server computer 105, through the use of the communication protocol, as to whether higher-level or lower-level graphics commands are to be sent to the client computer 110.

Remote device interface 345 includes a higher-level graphics command processor 350 or a GDI/GDI+ rendering engine 355 for lower-level graphics commands, depending on whether the client computer 110 generates graphics using higher-level or lower-level graphics commands. In the case where the client computer 110 generates graphics using higher-level graphics commands, higher-level graphics command processor 350 extracts data packets that include higher-level graphics commands from a received stream of data from the server computer 105. When the client computer 105 uses lower-level graphics commands to generate graphics, the received stream of data from the server includes lower-level graphics commands which are processed by the GDI/GDI+ rendering engine 355 and passed to a GDI/GDI+ graphics driver 360 which generates graphics. The generated graphics are shown on a local display device such as display device 215 of FIG. 2.

When higher-level graphics commands are used by the client computer 110 to generate graphics, a client computer connector 365 receives the packets of data from higher-level graphics command processor 350, and parses the packets into higher-level graphics commands. The parsed higher-level graphics commands are sent from the client computer connector 365 to a compositor/UCE 370 which generates graphics using the higher-level graphics commands.

Figure 4:
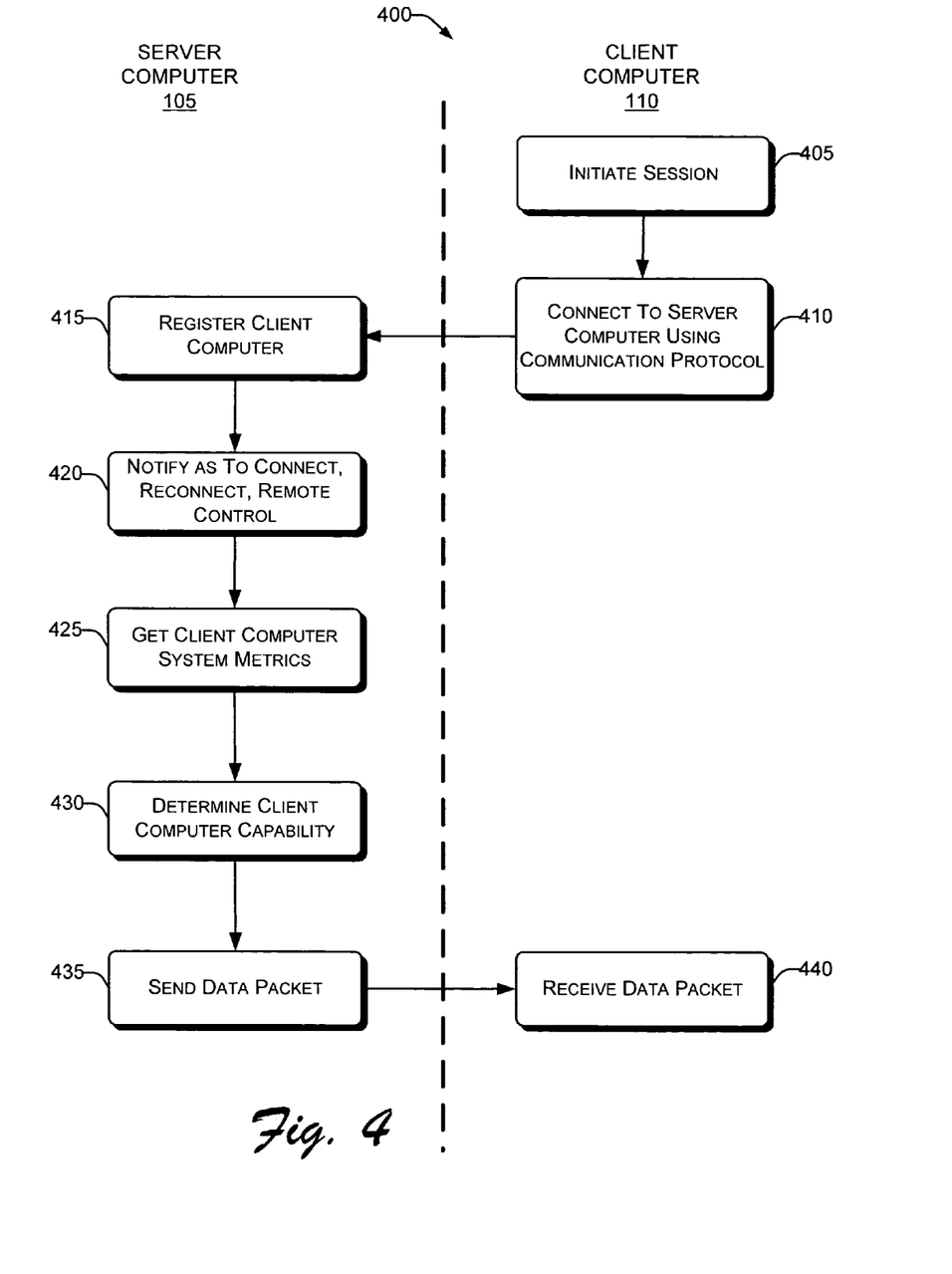
FIG. 4 is a flow diagram illustrating connection between a server computer and a client computer and providing either higher-level graphics commands or lower-level graphics commands to the client computer.

FIG. 4 shows a process 400 to connect server computer 105 to client computer 110 and provide higher-level or lower-level graphics commands. The process 400 takes place when client computer 110 accesses application programs at server computer 105 and receives higher-level or lower-level graphics commands in order to generate graphics.

The process 400 is illustrated as a collection of blocks in a logical flow graph, which represent a sequence of operations that can be implemented in hardware, software, or a combination thereof. In the context of software, the blocks represent computer instructions that, when executed by one or more processors, perform the recited operations. The process 400 is described with reference to server computer 105 and client computers 110 of FIG. 1, where server computer 105 provides for means to perform particular processes and one or more of client computers 110 provide means to perform particular processes.

At block 405, the client computer 110 initiates a session with the server computer 105 in order to access an application program at the server computer 105. The application program may be one of multiple application programs hosted by the server computer 105 and available to one or more client computers 110. The session may be initiated by a user at the client computer 110. As described above, the application programs provide graphics commands which may be passed on as formatted higher-level graphics commands or lower-level graphics commands used by the client computer 110 to generate graphics.

At block 410, the client computer 110 connects to the server computer 105 using a particular communication protocol such as RDP. Extensions (e.g., data fields) may be provided in the communication protocol to allow the server computer 105 to determine attributes of the client computer 110. In specific, such communication protocol extensions may be provided that allow the server computer 105 to determine if the client computer 110 generates graphics using higher-level or lower-level graphics commands, and to send either higher-level or lower-level graphics commands to the client computer 110.

At block 415, the server computer 105 registers the client computer 110. In specific, registration information is provided by the client computer 110 to the server computer 105. The registration information includes graphics generating capability of the client computer 110 (i.e., generating graphics using higher-level or lower-level graphics commands). Registration information may also include identifying whether the connection is to a remote client computer.

At block 420, the server computer 105 through the registration information (i.e., information stored at block 415) is notified as to a particular connection which may be a remote connection to client computer 110. In other situations, the connection may be a local connection or reconnection.

At block 425, the server computer 105 gets system metrics or metrics relevant to the server computer and client computer that describe whether a particular session provides higher-level graphics commands and/or lower-level graphics commands to a local display device (e.g., display device 120), to the client computer 110, or to both the local display device and the client computer 110. When higher-level graphics commands and/or lower-level graphics commands are provided both to the local display device and the client computer, shadowing takes place such that graphics generated at the client computer 110 are generated or monitored locally at the server computer 105.

At block 430, the server computer 105 determines the capability of the client computer 110 to receive and use either higher-level or lower-level graphics commands. Information as to the capability of the client computer 110 in generating graphics using either higher-level or lower-level graphics commands may be extracted from registration information as described in block 415.

At block 435, a data packet is sent from the server computer 105 to the client computer 110. The data packet may be part of a data stream and includes either higher-level graphics commands or lower-level graphics commands processed, formatted, and packaged as described in FIG. 3.

At block 440, the client computer 110 receives the data packet. The data packet which contains higher-level or lower-level graphics commands is processed and rendered into graphics at the client computer 110 as described in FIG. 3

Figure 5:
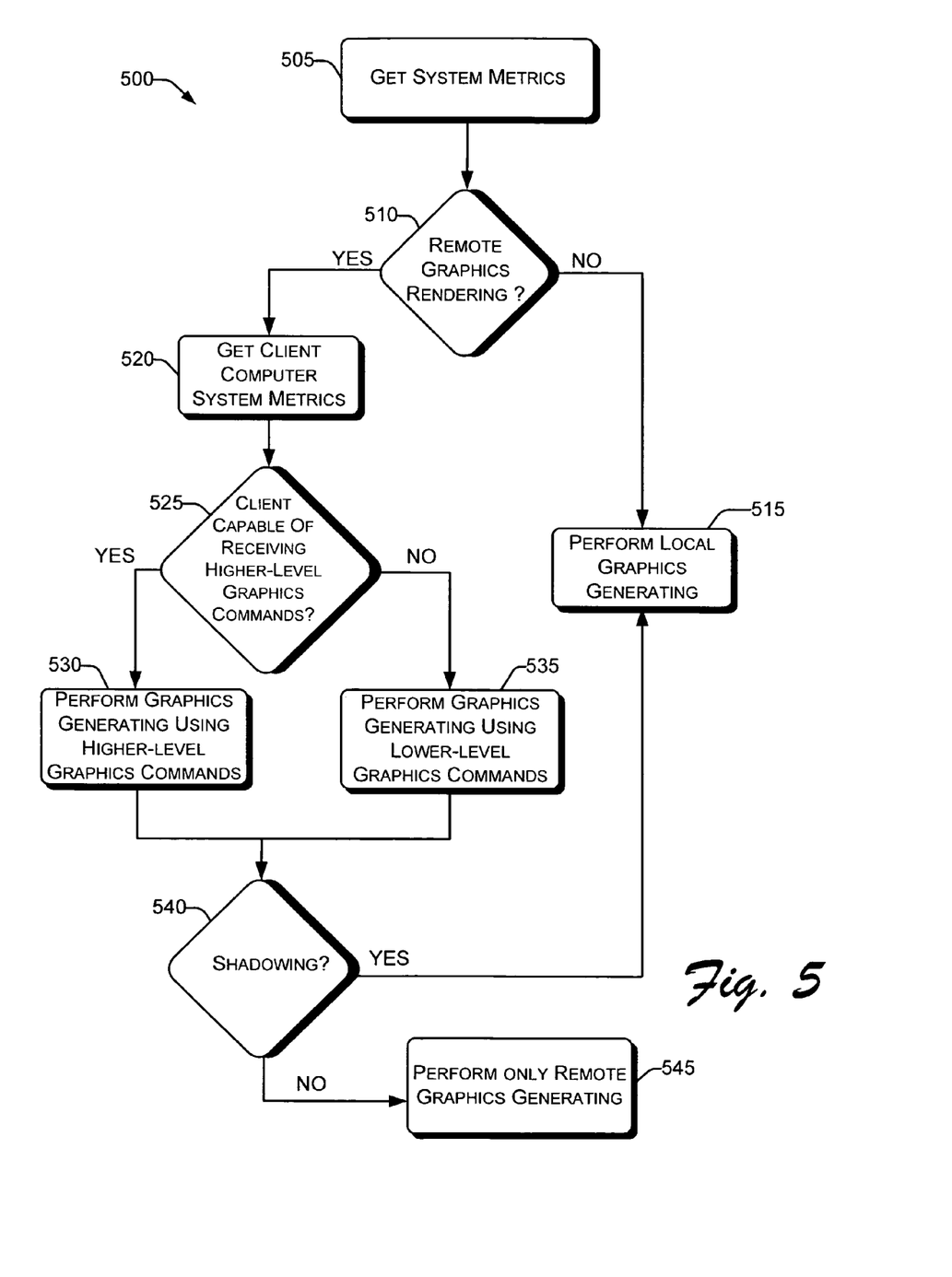
FIG. 5 is a flow diagram illustrating providing higher-level graphics commands to generate graphics at a local server computer display device and providing either higher-level graphics commands or lower-level graphics commands to generate graphics at a client computer.

FIG. 5 shows a process 500 to provide higher-level or lower-level graphics commands to a client computer, and higher-level graphics commands used to generate graphics locally when shadowing takes place.

The process 500 is illustrated as a collection of blocks in a logical flow graph, which represent a sequence of operations that can be implemented in hardware, software, or a combination thereof. In the context of software, the blocks represent computer instructions that, when executed by one or more processors, perform the recited operations. The process 500 is described with reference to server computer 105 of FIG. 1, where server computer 105 provides for means to perform particular processes.

At block 505, the server computer 105 gets system metrics which are relevant to a particular session between the server computer 105 and client computer 110. The system metrics describe whether the particular session is to provide higher-level graphics commands used to generate graphics to be displayed to a local display device (e.g., display device 120); higher-level or lower-level graphics commands to the client computer 110; or whether shadowing is to take place. The system metrics may be extracted from registration information as described above in block 415 of FIG. 4.

When shadowing takes place a local compositing or generating of graphics from higher-level graphics commands takes place. In certain cases, graphics will only be generated and displayed locally. In other words, there may be sessions in which client computer 110 is not involved and remote graphics generating is not performed (i.e., following the "NO" branch of block 510). At block 515 local graphics generating takes place. The compositor/UCE 305 of FIG. 3 provides higher-level graphics commands from application programs, which are used to generate graphics locally.

For sessions where graphics generating at client computer 110 takes place (i.e., following the "YES" branch of block 510), at block 520 server computer 105 determines the system metrics of client computer 110 which includes whether client computer 110 may be a legacy client computer which uses lower-level graphics commands, or whether client computer 110 uses higher-level graphics commands to perform graphics generating.

If client computer 110 is able to receive higher-level graphics commands or a graphics packet with higher-level graphics commands used to generate graphics (i.e., following the "YES" branch of block 525), at block 530 client computer 110 is sent the higher-level graphics commands which may be in the form of a packet and compositing or generating of graphics is performed by client computer 110.

If client computer 110 is not able to receive (i.e., does not use) higher-level graphics commands, client computer 110 may be a legacy computer (i.e., following the "NO" branch of block 525). At block 535, lower-level graphics commands are sent to client computer 110 to allow for graphics generating at client computer 110.

In certain cases, shadowing takes place in which graphics images represented by higher-level or lower-level graphics commands sent to client computer 110 are also viewed at server computer 105 through a local display device such as display device 120 of FIG. 1. If shadowing takes place (i.e., following the "YES" branch of block 540), local graphics generating is performed as to block 515. If shadowing does not take place (i.e., following the "NO" branch of block 540), at block 545 only remote graphics generating is performed at client computer 110 (as to blocks 530 or 535).

Server and Client Computers

Figure 6:
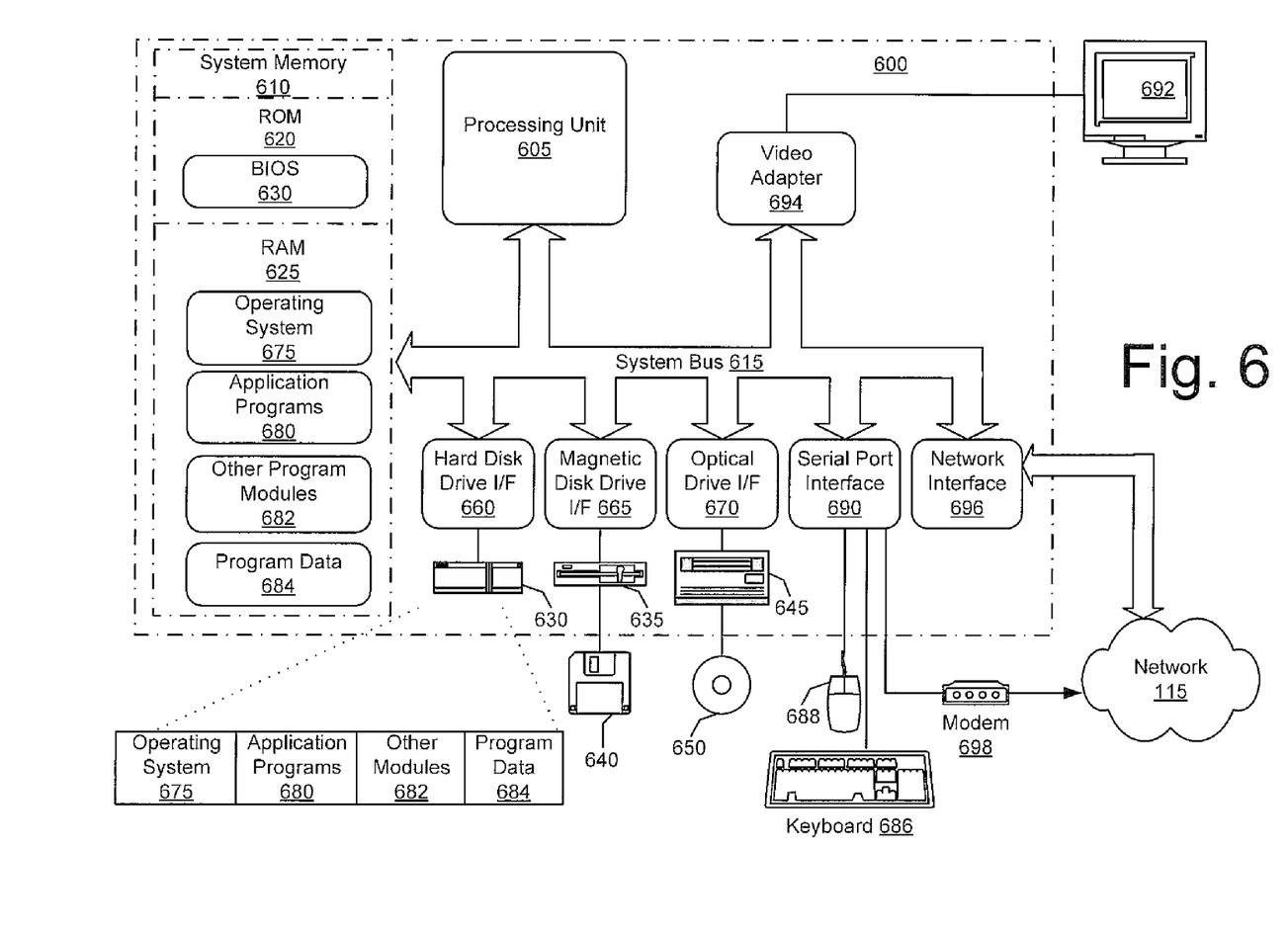
FIG. 6 is a block diagram that may be either a server computer or client computer.

FIG. 6 shows an example implementation of a computer 600 which may be a server computer such as server computer 105 or a client computer such as client computers 110. As appreciated by those skilled in the art, particular components described in reference to FIG. 6 are not included in particular implementations. For example, client computer 110(3) which is a handheld PC is a more simplified implementation compared to a desktop PC such as client computer 110(1), and may not need particular components (e.g., certain storage devices). Furthermore, particular implementations may use different components to provide similar functionality as components described in reference to FIG. 6. In addition, as discussed below a server computer implementation may include particular application programs and graphics drivers.

Computer 600 may be configured with a Windows® brand operating system. The computer 600 includes a processing unit 605, a system memory 610, and a system bus 615 that interconnects various system components, including the system memory 610 to the processing unit 605. The system bus 615 may be implemented as any one of several bus structures and using any of a variety of bus architectures, including a memory bus or memory controller, a peripheral bus, and a local bus.

The system memory 610 includes read only memory (ROM) 620 and random access memory (RAM) 625. A basic input/output system 630 (BIOS) is stored in ROM 620.

The computer 600 has one or more of the following drives: a hard disk drive 630 for reading from and writing to a hard disk or hard disk array, a magnetic disk drive 635 for reading from or writing to a removable magnetic disk 640, and an optical disk drive for reading from or writing to a removable optical disk 650 such as a CD ROM or other optical media. The hard disk drive 630, magnetic disk drive 635, and optical disk drive 645 are connected to the system bus 615 by a hard disk drive interface 660, a magnetic disk drive interface 665, and an optical drive interface 670, respectively. The drives and their associated computer-readable provide nonvolatile storage of computer readable instructions, data structures, program modules and other data for computer 600.

Although hard disk 630, removable magnetic disk 640, and removable optical disk 650 are described, other types of computer readable media can be used to store data. Other such media include magnetic cassettes, flash memory cards, digital video disks, Bernoulli cartridges, random access memories (RAMs), read only memories (ROMs), and the like. Additionally, the computer 600 may be configured to serve data stored on an independent system, such as a RAID (redundant array of independent disks) storage system, particularly when implemented as a terminal server.

A number of program modules may be stored on the hard disk 630, magnetic disk 640, optical disk 650, ROM 620, or RAM 625. The programs include a server operating system 675, one or more application programs 680, other program modules 682, and program data 684.

A user may enter commands and information into the computer 600 through input devices such as keyboard 686 and a mouse 688. Other input devices (not shown) may include a microphone, joystick, game pad, satellite dish, scanner, and the like. These an other input devices are connected to the processing unit 605 through a serial port interface 690 that is couple to the system bus 615, but may alternatively be connected by other interfaces, such a parallel port, game port, or a universal serial bus (USB).

A monitor 692 or other type of display is also connected to the system bus 615 via an interface, such as a video adapter card 694. The computer 600 has a network interface or adapter 696, a modem 698 or other means for establishing communications over the network 115, such as an Internet connection. The modem 698 may also facilitate connection from another computer. In a server computer implementation, monitor 692 and input devices such as keyboard 686 and mouse 688 may be considered as a display device such as display device 120 of FIG. 1.

CONCLUSION

The above-described server sends graphics primitives or graphics data to client computers which render graphics primitives or graphics data to graphics representative of graphics from application programs resident at the server. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of generating graphics comprising:
   connecting a server computer to a client computer, wherein the server computer is configured to transmit graphics commands to the client computer;
   receiving, at the server computer through a connection, information as to whether the client computer is able to generate graphics using higher-level graphics commands, wherein an application program resident at the server computer provides the higher-level graphics commands;
   determining, at the server computer, whether the higher-level graphics commands are to be generated into graphics at the server computer and at the client computer;
   sending the higher-level graphics commands from the server computer to the client computer if the client computer is able to generate graphics using the higher-level graphics commands and when the graphics are to be generated at the client computer; and
   generating the graphics at the server computer using the higher-level graphics commands when the graphics are to be generated at the server computer.

2. The method of claim 1 wherein the connecting is performed using a communication protocol.

3. The method of claim 2 wherein extensions are provided in the communication protocol to determine if the client computer is able to generate graphics using higher-level graphics commands.

4. The method of claim 1 wherein the receiving information includes registration information particular to the client computer.

5. The method of claim 1 wherein the sending the higher-level graphics commands uses a formatted data packet as part of a data stream.

6. The method of claim 1 wherein the sending is performed using a transmission control protocol.

7. The method of claim 1 further comprising sending relatively lower-level graphics commands processed from the higher-level graphics commands to the client computer if the client computer is not able to generate graphics using the higher-level graphics commands.

8. The method of claim 7 further comprising displaying the generated graphics to a display device local to the server computer.

9. One or more computer-readable media comprising computer-executable instructions that, when executed, perform the method as recited in claim 7.

10. The method of claim 1 further comprising displaying the generated graphics to a display device local to the server computer.

11. One or more computer-readable media comprising computer-executable instructions that, when executed, perform the method as recited in claim 1.

12. A method of reducing server computer graphics requirements comprising:
   connecting a server computer configured to transmit graphics commands to a client computer with the client computer;
   determining at the server computer if the client computer is able to generate and display graphics using higher-level graphics commands;
   determining at the server computer whether the higher-level graphics commands are to be generated into graphics at the server computer, at the client computer, or at both the server computer and the client computer;
   sending the higher-level graphics commands from the server computer to the client computer if the client computer is able to generate graphics using the higher-level graphics commands and when the client computer is to generate graphics using the higher-level graphics commands; and
   generating graphics at the server computer using the higher-level graphics commands when the graphics are to be generated at the server computer.

13. The method of claim 12 wherein the connecting is performed using a communication protocol.

14. The method of claim 12 wherein determining if the client computer is able to generate and display graphics using higher-level graphics commands includes receiving information from the client computer as to information particular to the client computer.

15. The method of claim 12 wherein the sending uses a formatted data packet as part of a data stream.

16. The method of claim 12 further comprising sending relatively lower-level graphics commands to the client computer if the client computer is not able to generate graphics using the higher-level graphics commands.

* * * * *